United States Patent [19]
Ueno

[11] Patent Number: 4,534,218
[45] Date of Patent: Aug. 13, 1985

[54] THERMAL FLOW METER

[75] Inventor: Sadayasu Ueno, Katsuta, Japan

[73] Assignee: Hitachi, Ltd., Tokyo, Japan

[21] Appl. No.: 523,858

[22] Filed: Aug. 17, 1983

[30] Foreign Application Priority Data

Aug. 23, 1982 [JP] Japan .................................. 57-144738

[51] Int. Cl.³ ................................................ G01F 1/68
[52] U.S. Cl. ....................................................... 73/204
[58] Field of Search ........................................ 73/204

[56] References Cited

U.S. PATENT DOCUMENTS

| | | | |
|---|---|---|---|
| 3,975,951 | 8/1976 | Kohama et al. | 73/204 |
| 4,056,975 | 11/1977 | LeMay | 73/204 |
| 4,297,881 | 11/1981 | Sasayama et al. | 73/204 |
| 4,373,387 | 2/1983 | Nishimura et al. | 73/204 |
| 4,400,974 | 8/1983 | Nishimura et al. | 73/204 X |

Primary Examiner—Herbert Goldstein
Attorney, Agent, or Firm—Antonelli, Terry & Wands

[57] ABSTRACT

The current flowing through a thermosensitive element is amplified and output as a signal indicating its magnitude. The signal is processed by being converted into a digital signal and is used to calculate, for example, the quantity of fuel that should be supplied for the thus measured quantity of intake air in an internal-combustion engine. The current is supplied to the thermosensitive element from the positive electrode of a power source, and returns to the negative electrode thereof via a return line. The return line and a ground potential line of the amplifier are separate lines. The magnitude of the current flowing through the thermosensitive element is varied by varying the potential of a point on the return line accordingly. Because the return line and the ground potential line are separate, the ground potential can be kept constantly stable.

5 Claims, 3 Drawing Figures

THERMAL FLOW METER

BACKGROUND OF THE INVENTION

This invention relates generally to a thermal flow meter, and more particularly to a thermal flow meter which is suitable for measuring the quantity of intake air in an internal combustion engine.

As a thermal flow meter of the kind described above, a flow meter in which a temperature-dependent resistor made of a material such as platinum is disposed inside an air intake pipe has been known in the past (e.g. U.S. Pat. No. 3,747,577). Negative feedback control is effected so that the temperature-dependent resistor is kept at a constant temperature. The quantity of heat lost from the temperature-dependent resistor changes with changes in the intake air quantity, but since feedback control is effected so that its temperature remains constant, the intake air quantity can be measured by measuring the value of the current flowing through the resistor. However, the prior art device has the problem that its measurement accuracy is low.

SUMMARY OF THE INVENTION

The present invention is therefore designed to obviate the problem described above and is directed to providing a thermal flow meter with a high measurement accuracy.

As a result of intensive studies on measurement accuracy, the inventor of the present invention has clarified the following fact. The heating current varies between about 10 mA and about 150 mA, this heating current is detected and amplified, but the variations in the heating current strongly affect the detected and amplified signal, which reduces the measurement accuracy.

Accordingly, the present invention provides a separate return line for returning a current from a thermosensitive element to a power source, and a ground potential line for an amplifier connected to the thermosensitive element, and grounds this ground potential line within a signal processing section.

DESCRIPTION OF THE PREFERRED EMBODIMENTS

Hereinafter, one embodiment of the present invention will be described with reference to the accompanying drawings.

Figure 1:
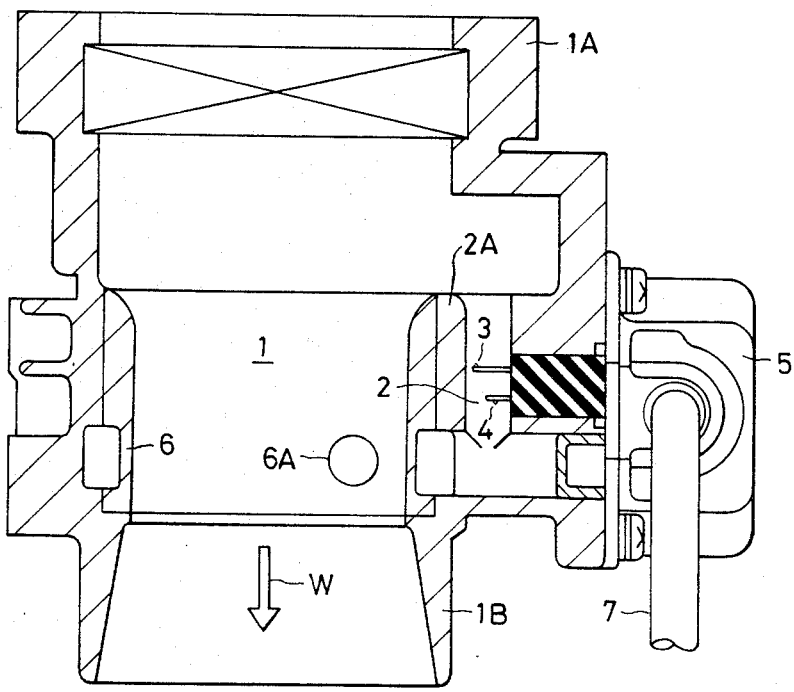
FIG. 1 is a partially sectioned view of the sensor-fitting portion of a thermal flow meter in accordance with one embodiment of the present invention.

FIG. 1 shows the arrangement of a sensor. In the drawing, a bypass pipe 2 is provided by the side of an intake pipe 1. The downstream side of the bypass pipe 2 communicates with an annular passage defined between it and an insertion pipe 6 encompassing the intake passage. The insertion pipe 6 opens to the intake passage through an outlet 6A. A venturi section is defined by the insertion pipe 6 and a skirt portion 1B, and the outlet 6A opens into the most constricted portion of the venturi. Hence, the outlet 6A is kept at a negative pressure, and part of the air flowing through the intake passage flows into the bypass pipe. Air is taken into the bypass pipe 2 by static pressure and its flow is made laminar by a bell mouth 2A. A thermosensitive element 3, made of platinum or a similar material, to measure the intake air quantity and a temperature compensation element 4, made similarly of platinum or the like, are provided inside the bypass pipe 2. A circuit for controlling the temperature of the thermosensitive element 3 to be at a constant level, etc., is disposed inside a circuit case 5. A detection signal is input to a CPU for signal processing through a cable 7. The air flowing in the direction shown by the arrow W is supplied to the combustion chambers of an internal combustion engine.

Figure 2:
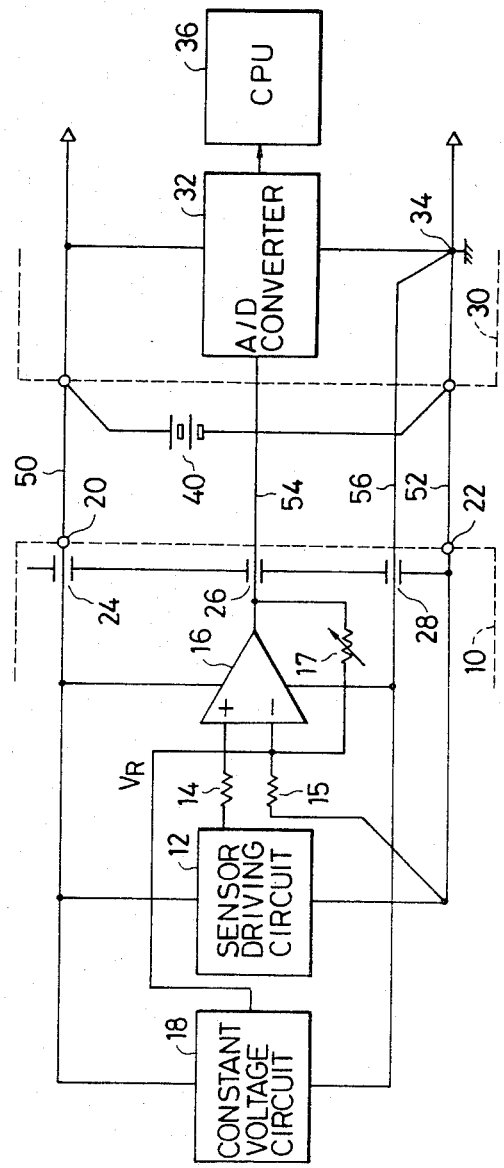
FIG. 2 is a block circuit diagram of the thermal flow meter of FIG. 1.

The circuit configuration will now be explained with reference to FIG. 2. The section encircled by a dashed line on the left of the drawing is a sensor section 10. It includes the resistors 3, 4 and the circuit inside the circuit case 5. The section encircled by a dashed line on the right of the drawing is a signal processing section 30, which includes the CPU, etc., and is mounted on the vehicle. The current from a battery 40 is input to the sensor section 10 and the signal processing section 30.

The construction of the sensor section 10 will be described next. As will be described elsewhere, a sensor driving circuit 12 includes the thermosensitive element 3, the temperature compensation element 4 and a control circuit which keeps the thermosensitive element at a predetermined temperature. A current is input to this driving circuit 12 from the battery 40 through a signal line 50 and a connector 20 provided at an intermediate portion on the signal line. The current returns to the battery 40 through a return line 52 and a connector 22 provided at an intermediate portion on the return line. An air flow rate signal detected by the sensor-driving circuit 12 is applied to the positive input terminal of a differential amplifier 16 through a resistor 14. A terminal of the sensor-driving circuit 12 on the return line 52 side is connected to the negative input terminal of the differential amplifier 16 through a resistor 15. The voltage across the two ends of a resistor detecting the heating current which flows through the thermosensitive element 3 is input to the differential amplifier 16, and a differential voltage is output. In the amplification of an air flow rate signal, a differential amplifier with the construction described above is used for the first time in the present invention. In other words, in accordance with the prior art a simple amplifier amplifies the output of the resistor 14.

A feedback resistor 17 is provided in the differential amplifier 16, the resistor 17 is variable. A constant voltage circuit 18 whose output is variable applies a reference voltage $V_R$ to the negative input terminal of the differential amplifier 16. The feedback resistor 17 and the reference voltage $V_R$ make the adjustment between zero and span. This adjustment is carried out in the following manner. A reference output value $V_1$ for the adjustment when the air flow rate is 20 kg/H and the reference output value $V_2$ when the air flow rate is between 200 and 300 kg/H, for example, are determined in advance. When making the adjustment, the output values when the air flow rate is 20 kg/H and 300 kg/H are obtained, respectively, and are compared with the reference output values $V_1$ and $V_2$. The value of the feedback resistor 17 is changed as required in accordance with each difference from the reference values to change the gain of the amplifier 16. The outputs with respect to the two flow rates are again determined, but this time the reference value $V_R$ is changed as required.

These two adjustments are repeated two or three times so that the output values can be easily brought into conformity with the reference output values, and the adjustment can thus be carried out. It is another characterizing features of the present invention that this zero-span adjustment circuit is provided in the sensor section 10.

The output of the differential amplifier 16 is applied to an A/D converter 32 within the signal processing section 30 through a flow rate signal line 54 and is converted into a digital signal. This digital signal is input to the CPU 36 and is used as data for determining the quantity of fuel injected.

A ground potential line 56 for the differential amplifier 16 and of the constant voltage circuit 18 is provided separate from the return line 52. The ground potential line 56 leads from the sensor section 10 to the signal processing section 30 and is grounded at a point 34 close to the input terminal of the A/D converter 32. It is a further one of the characterizing features of the present invention that the ground potential line 56 is provided separate from the return line 52, and is grounded within the signal processing section 30.

The input ends of each the lines 50, 54 and 56 to the input terminals of the sensor section 10 are passed through chip capacitors 24, 26, 28 to deal with noise.

Figure 3:
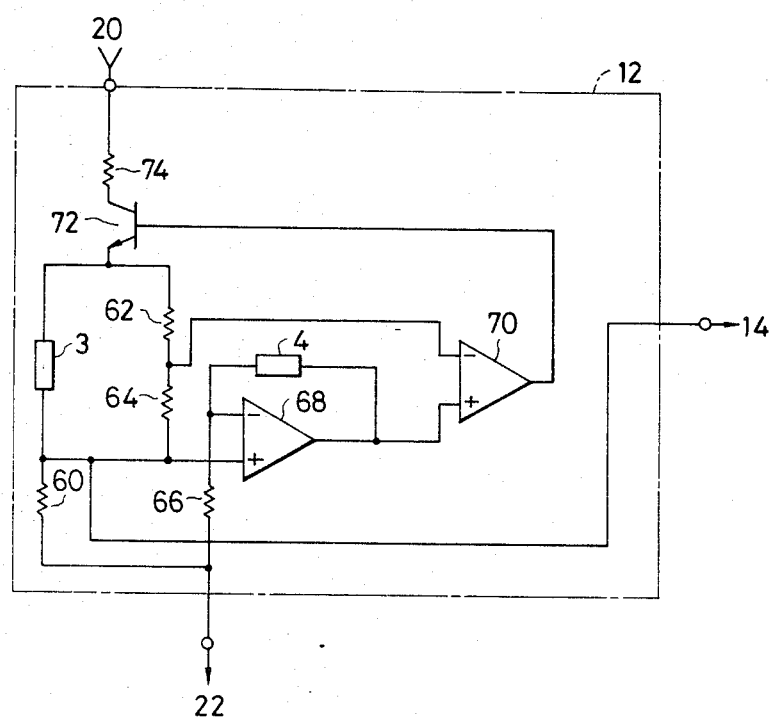
FIG. 3 is a circuit diagram of the sensordriving section of the thermal flow meter of FIG. 1.

The sensor-driving circuit 12 will now be described in detail with reference to FIG. 3. A resistor 60 is connected in series with the thermosensitive resistor 3. A series circuit of resistors 62 and 64 is connected parallel to the thermosensitive resistor 3 and divides the voltage across the ends of the thermosensitve resistor 3. The temperature compensation resistor 4 is connected in series with a resistor 66. The node between the thermosensitive resistor 3 and the resistor 60 is connected to the non-inverting input of an amplifier 68, and the node between the resistors 4 and 66 is connected to the inverting input. The output of the amplifier 68 is connected to the non-inverting input of an amplifier 70, and the inverting input is connected to the node between resistors 62 and 64. The output of the amplifier 70 is applied to the base of a transistor 72. The collector of the transistor 72 is connected to the terminal 20 from the battery 40 via a resistor 74. The emitter of the transistor 72 is connected to the node between the thermosensitive resistor 3 and the resistor 62, and the node between the resistors 60 and 66 is connected to the terminal 22. The node between the thermosensitive resistor 3 and the resistor 60 is connected to the amplifier 16 via the resistor 14.

When the transistor 72 is conductive, the emitter current of the transistor 72 flows through the series circuit of the resistors 3 and 60, and also through the voltage-dividing circuit of the resistors 62 and 64. The amplifier 68 compares the potential between its inverting input and non-inverting input, that is, the potential between the node of the resistors 3, 60 and the node of the resistors 4, 66, and controls the output voltage so that they are equal to each other. The amplifier 70 controls the base voltage of the transistor 72 so that the potential at the node between the resistors 62, 64 and the output potential of the amplifier 68 is equal. In other words, the amplifier 70 controls so that the voltage of the thermosensitive element 3 divided between its terminals and the voltage between the ends of the resistor 4 is equal. Accordingly, the voltage between the ends of the resistor 4 can be made much smaller than that of the resistor 3. In this case, the current flowing through the thermosensitive resistor 3 is a function of the flow rate when in equilibrium, and this current is equal to the current flowing through the resistor 60 so that the flow rate of the fluid can be measured by measuring the voltage between the ends of the resistor 60.

In the embodiment described above, the ground potential line 56 and the return line 52 are provided separately, and the grounding point of the ground potential line is within the signal processing section 30. This arrangement provides the following advantage. For the sake of comparison, it is assumed that the two lines are common, and the grounding point is within the signal processing section. In this case, a region whose resistance changes markedly with the passage of time is formed in the return line 52 from the grounding side of the circuit 12 to the grounding point. The heating current flowing through the heating resistor 3 from the circuit 12 flows through the return line. Since this heating current changes with the air flow rate, the voltage between the grounding point and the junction between the return line and the ground potential line changes. This change causes a voltage change in the ground terminal of the amplifier 16 so that the accuracy of the amplification of the amplifier 16 drops. In contrast, the present invention eliminates such a problem. Incidentally, if the grounding point were disposed on the sensor side, grounding could be effected by grounding it to the car body; hence, another problem would occur in that it would be easily affected by high voltages such as that of the ignition signal.

Since the amplifier 16 is a differential amplifier, only the voltage between the two ends of the resistor 60 detecting the heating current can be measured with a high level of accuracy. The influence of changes in the ground potential of the amplifier 16 is reduced.

As described in detail in the foregoing, the present invention improves the measurement accuracy of a flow meter.

What is claimed is:

1. A thermal flow meter comprising: sensor means including a thermosensitive element and an amplifier for amplifying a current flowing through said thermosensitive element; signal processing means including an A/D converter for converting the signal form said amplifier to a digital signal, and a digital calculation means; a power source; a signal line for applying a current from said power source to said thermosensitive element and said amplifier; a return line for returning the current from said thermosensitive element to said power source; and a ground potential line for said amplifier; said ground potential line being separate from said return line and being grounded within said signal processing means.

2. The thermal flow meter as defined in claim 1 wherein the grounding point of said ground potential line is common to the grounding point of said A/D converter.

3. The thermal flow meter as defined in claim 1, wherein said amplifier is a differential amplifier, a resistor for detecting a current flowing through said thermosensitive element being connected in series with said thermosensitive element, and the two ends of said resistor being connected to respective input terminals of said differential amplifier.

4. The thermal flow meter as defined in claim 1 wherein said sensor means includes a zero-to-span adjustment circuit and said zero-to-span adjustment circuit a constant voltage source for applying a predetermined voltage to an input terminal of said amplifier, and a feedback resistor for said amplifier.

5. The thermal flow meter as defined in claim 1, wherein noise-eliminating capacitors are provided at terminals of said signal line, a flow rate signal line for applying the signal from said amplifier to said A/D converter, and said ground potential line with said sensor means.

* * * * *